United States Patent
Johnson et al.

(10) Patent No.: US 11,213,950 B2
(45) Date of Patent: Jan. 4, 2022

(54) PROXIMATE ROBOT OBJECT DETECTION AND AVOIDANCE

(71) Applicant: Locus Robotics Corp., Wilmington, MA (US)

(72) Inventors: Michael Charles Johnson, Ashland, MA (US); Sean Johnson, Danvers, MA (US); Luis Jaquez, Burlington, MA (US); Bruce Welty, Boston, MA (US)

(73) Assignee: Locus Robotics Corp., Wilmington, MA (US)

( * ) Notice: Subject to any disclaimer, the term of this patent is extended or adjusted under 35 U.S.C. 154(b) by 413 days.

(21) Appl. No.: 16/264,901

(22) Filed: Feb. 1, 2019

(65) Prior Publication Data

US 2020/0246971 A1    Aug. 6, 2020

(51) Int. Cl.
*B25J 9/16* (2006.01)
*B25J 5/00* (2006.01)
*B66F 9/06* (2006.01)

(52) U.S. Cl.
CPC ............ *B25J 9/1666* (2013.01); *B25J 5/007* (2013.01); *B66F 9/063* (2013.01)

(58) Field of Classification Search
CPC .......... B25J 9/1666; B25J 5/007; B66F 9/063; G05D 1/028; G05D 2201/0216
See application file for complete search history.

(56) References Cited

U.S. PATENT DOCUMENTS

| | | |
|---|---|---|
| 9,463,927 B1 | 10/2016 | Theobald |
| 10,148,497 B1 | 12/2018 | Roche |
| 2010/0296908 A1 | 11/2010 | Ko |
| 2011/0200420 A1 | 8/2011 | Driskill et al. |
| 2012/0143427 A1 | 6/2012 | Hoffman et al. |

(Continued)

FOREIGN PATENT DOCUMENTS

WO    2017/160790 A1    9/2017

OTHER PUBLICATIONS

Brandtner Daniel et al : "Coherent swarming of unmanned micro aerial vehicles with minimum computational and communication requirements", 2017 European Conference on Mobile Robots, Sep. 6, 2017, pp. 1-6, XP033251314 [retrieved on Nov. 6, 2017].

(Continued)

*Primary Examiner* — Basil T. Jos
(74) *Attorney, Agent, or Firm* — Sunstein LLP

(57) ABSTRACT

Systems and methods for proximate robot object detection and avoidance are provided herein which include a receiver in electronic communication with an autonomous robot and configured to receive a broadcast message from a beacon, a processor, and a memory, the memory storing instructions that, when executed by the processor, cause the autonomous robot to detect, based on the received broadcast message, a proximity of the beacon to the autonomous robot, determine, from the received broadcast message, a beacon status, the beacon status indicating whether the beacon is stationary, approaching the autonomous robot, or withdrawing from the autonomous robot, identify, according to the detected proximity and the determined beacon status, a corresponding proximity operation, and control the autonomous robot to stop an ordinary operation and operate according to the identified proximity operation.

14 Claims, 13 Drawing Sheets

(56) References Cited

U.S. PATENT DOCUMENTS

| | | |
|---|---|---|
| 2012/0330458 A1 | 12/2012 | Weiss |
| 2013/0317642 A1 | 11/2013 | Asaria et al. |
| 2016/0271800 A1 | 9/2016 | Stubbs et al. |
| 2017/0255206 A1 | 9/2017 | Chen et al. |
| 2018/0072223 A1 | 3/2018 | Arunachalam et al. |
| 2018/0077546 A1 | 3/2018 | Arunachalam et al. |
| 2019/0025839 A1* | 1/2019 | Manjunath ............. G08G 1/166 |
| 2020/0042018 A1* | 2/2020 | Chiba .................. G05D 1/0274 |

OTHER PUBLICATIONS

International Search Report with Written Opinion, dated Apr. 29, 2020, received in international patent application No. PCT/US2020/016069, 12 pages.

\* cited by examiner

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| Location | Fiducial ID |
|---|---|
| L01001A | 11 |
| L01001B | 11 |
| L01001C | 11 |
| L01001D | 11 |
| L01001E | 11 |
| L01001F | 11 |
| L01002A | 12 |
| L01002B | 12 |
| L01002C | 12 |
| L01002D | 12 |
| L01002E | 12 |
| L01003A | 13 |
| L01003B | 13 |
| L01003C | 13 |
| L01003D | 13 |
| L01003E | 13 |
| L01003F | 13 |
| L01004A | 14 |
| L01004B | 14 |
| L01004C | 14 |
| L01004D | 14 |
| L01004E | 14 |
| L01005A | 15 |
| L01005B | 15 |
| L01005C | 15 |
| L01005D | 15 |
| L01005E | 15 |
| L01005F | 15 |

FIG. 7

PROXIMATE ROBOT OBJECT DETECTION AND AVOIDANCE

FIELD OF THE INVENTION

This invention relates to proximate robot object detection and avoidance and more particularly to use of proximity beacons for proximate robot object detection and avoidance.

BACKGROUND OF THE INVENTION

Ordering products over the internet for home delivery is an extremely popular way of shopping. Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible.

The order-fulfillment process typically takes place in a large warehouse that contains many products, including those listed in the order. Among the tasks of order fulfillment is therefore that of traversing the warehouse to find and collect the various items listed in an order. In addition, the products that will ultimately be shipped first need to be received in the warehouse and stored or "placed" in storage bins in an orderly fashion throughout the warehouse so they can be readily retrieved for shipping.

In a large warehouse, the goods that are being delivered and ordered can be stored in the warehouse very far apart from each other and dispersed among a great number of other goods. With an order-fulfillment process using only human operators to place and pick the goods requires the operators to do a great deal of walking and can be inefficient and time consuming. Since the efficiency of the fulfillment process is a function of the number of items shipped per unit time, increasing time reduces efficiency.

In order to increase efficiency, robots may be used to perform functions of humans or they may be used to supplement the humans' activities. For example, robots may be assigned to "place" a number of items in various locations dispersed throughout the warehouse or to "pick" items from various locations for packing and shipping. The picking and placing may be done by the robot alone or with the assistance of human operators. For example, in the case of a pick operation, the human operator would pick items from shelves and place them on the robots or, in the case of a place operation, the human operator would pick items from the robot and place them on the shelves.

To the extent that the robots concurrently navigate a warehouse space alongside other equipment, such as forklifts, tuggers, etc., the risk of navigational disruption and collisions can increase or decrease depending on proximity between an instant robot location and other equipment. For example, during an order fulfillment operation, a robot may navigate between narrow aisles where other equipment is not permitted and large, high-speed throughways where collision risk is high. Additionally, to the extent that construction, maintenance, non-navigable obstacles, displaced products, pallets, bins, or shelves, or other such temporary or permanent impediments are introduced to the warehouse environment, risk of navigational disruption and/or collisions may be further increased as navigation of both the robot and the other equipment may be altered and visibility may be obstructed.

BRIEF SUMMARY OF THE INVENTION

Provided herein are systems and methods for proximate robot object detection and avoidance.

In one aspect, a proximate robot object detection and avoidance system is provided. The system includes a receiver in electronic communication with an autonomous robot and configured to receive a broadcast message from a beacon. The system also includes a processor. The system also includes a memory. The memory stores instructions that, when executed by the processor, cause the autonomous robot to detect, based on the received broadcast message, a proximity of the beacon to the autonomous robot. The memory also stores instructions that, when executed by the processor, cause the autonomous robot to determine, from the received broadcast message, a beacon status, the beacon status indicating whether the beacon is stationary, approaching the autonomous robot, or withdrawing from the autonomous robot. The memory also stores instructions that, when executed by the processor, cause the autonomous robot to identify, according to the detected proximity and the determined beacon status, a corresponding proximity operation. The memory also stores instructions that, when executed by the processor, cause the autonomous robot to control the autonomous robot to stop an ordinary operation and operate according to the identified proximity operation.

In some embodiments, operating the autonomous robot according to the identified proximity operation includes causing the autonomous robot to operate at reduced speed. In some embodiments, operating the autonomous robot according to the identified proximity operation includes causing the autonomous robot to remain in place for a predetermined wait time. In some embodiments, operating the autonomous robot according to the identified proximity operation includes causing the autonomous robot to navigate to a new location. In some embodiments, operating the autonomous robot according to the identified proximity operation includes causing the autonomous robot to remain in place until the determined beacon status changes.

In some embodiments, the receiver is further configured to receive a second broadcast signal from the beacon. In some embodiments, the memory also stores instructions that, when executed by the processor, cause the autonomous robot to detect, based on the second received broadcast message, an updated proximity of the beacon to the autonomous robot. In some embodiments, the memory also stores instructions that, when executed by the processor, cause the autonomous robot to determine, from the second received broadcast message, an updated beacon status, the updated beacon status indicating whether the beacon is stationary, approaching the autonomous robot, or withdrawing from the autonomous robot. In some embodiments, the memory also stores instructions that, when executed by the processor, cause the autonomous robot to identify, according to the detected updated proximity and the determined updated beacon status, a corresponding second proximity operation. In some embodiments, the memory also stores instructions that, when executed by the processor, cause the autonomous robot to control the autonomous robot to stop the proximity operation and operate according to the identified second proximity operation. In some embodiments, operating the autonomous robot according to the identified second proximity operation includes causing the autonomous robot operate at reduced speed. In some embodiments, operating the autonomous robot according to the identified second proximity operation includes causing the autonomous robot revert to ordinary operation.

In another aspect, an autonomous robot is provided. The autonomous robot includes a receiver configured to receive a broadcast message from a beacon. The autonomous robot also includes a processor. The autonomous robot also includes a memory. The memory stores instructions that, when executed by the processor, cause the autonomous robot to detect, based on the received broadcast message, a proximity of the beacon to the autonomous robot. The memory also stores instructions that, when executed by the processor, cause the autonomous robot to determine, from the received broadcast message, a beacon status, the beacon status indicating whether the beacon is stationary, approaching the autonomous robot, or withdrawing from the autonomous robot. The memory also stores instructions that, when executed by the processor, cause the autonomous robot to identify, according to the detected proximity and the determined beacon status, a corresponding proximity operation. The memory also stores instructions that, when executed by the processor, cause the autonomous robot to control the autonomous robot to stop an ordinary operation and operate according to the identified proximity operation.

In some embodiments, the beacon is not positioned on the robot. In some embodiments, the beacon is mounted to at least one of mobile equipment or non-permanent stationary equipment. In some embodiments, the mobile equipment includes one or more of a forklift, a tugger, a man-up truck, a lift, or combinations thereof. In some embodiments, the non-permanent stationary equipment includes one or more of a scaffold, a ladder, a safety sign, a safety cone, portable fencing, or combinations thereof. In some embodiments, operating the autonomous robot according to the identified proximity operation includes causing the autonomous robot to operate at reduced speed. In some embodiments, operating the autonomous robot according to the identified proximity operation includes causing the autonomous robot to remain in place for a predetermined wait time. In some embodiments, operating the autonomous robot according to the identified proximity operation includes causing the autonomous robot to navigate to a new location. In some embodiments, operating the autonomous robot according to the identified proximity operation includes causing the autonomous robot to remain in place until the determined beacon status changes.

In some embodiments, the receiver is further configured to receive a second broadcast signal from the beacon. In some embodiments, the memory also stores instructions that, when executed by the processor, cause the autonomous robot to detect, based on the second received broadcast message, an updated proximity of the beacon to the autonomous robot. In some embodiments, the memory also stores instructions that, when executed by the processor, cause the autonomous robot to determine, from the second received broadcast message, an updated beacon status, the updated beacon status indicating whether the beacon is stationary, approaching the autonomous robot, or withdrawing from the autonomous robot. In some embodiments, the memory also stores instructions that, when executed by the processor, cause the autonomous robot to identify, according to the detected updated proximity and the determined updated beacon status, a corresponding second proximity operation. In some embodiments, the memory also stores instructions that, when executed by the processor, cause the autonomous robot to control the autonomous robot to stop the proximity operation and operate according to the identified second proximity operation. In some embodiments, operating the autonomous robot according to the identified second proximity operation includes causing the autonomous robot operate at reduced speed. In some embodiments, operating the autonomous robot according to the identified second proximity operation includes causing the autonomous robot revert to ordinary operation.

These and other features of the invention will be apparent from the following detailed description and the accompanying figures, in which:

BRIEF DESCRIPTION OF THE FIGURES

FIG. 6 is a table of the fiducial identification to pose mapping;

FIG. 7 is a table of the bin location to fiducial identification mapping;

DETAILED DESCRIPTION OF INVENTION

Figure 1:
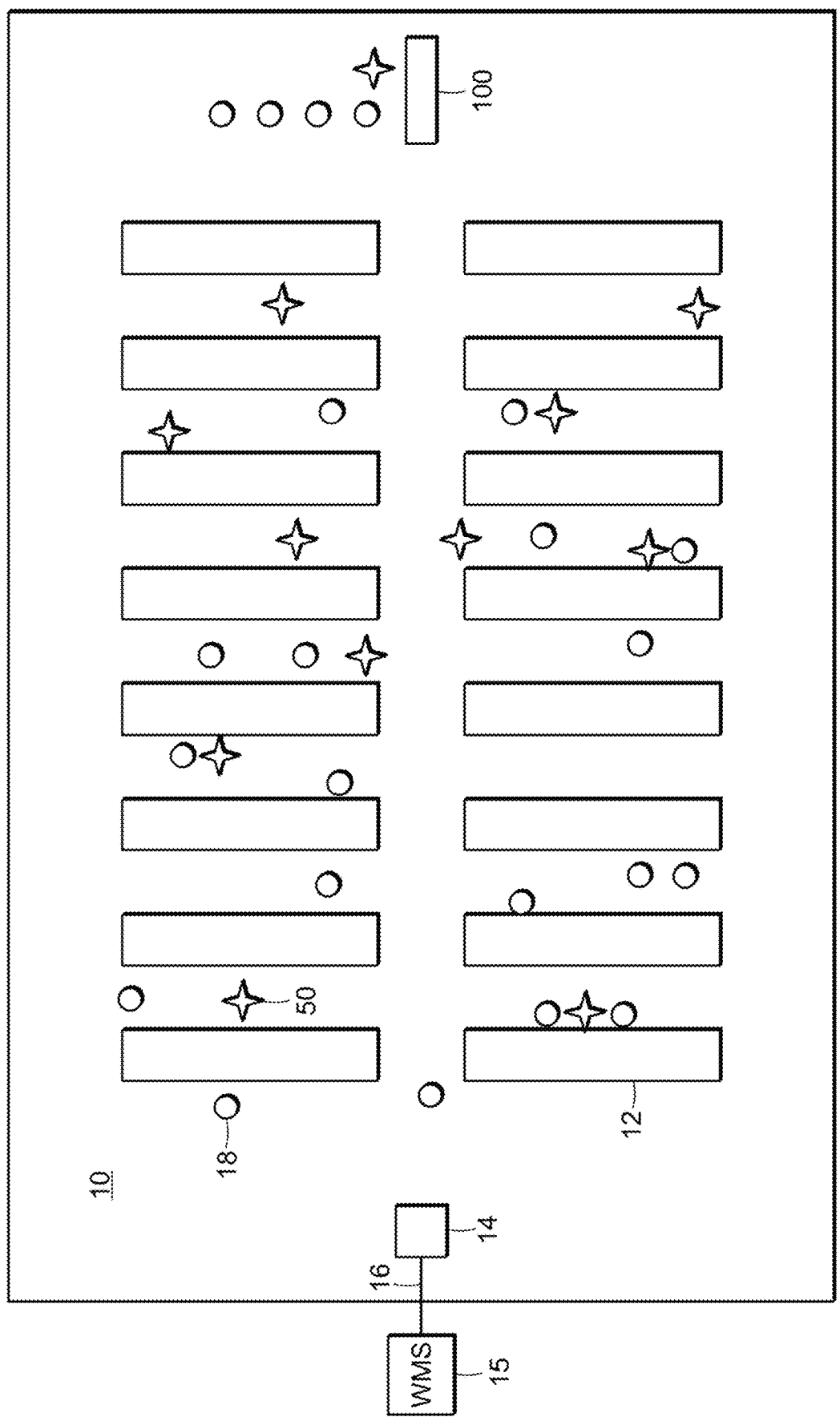
FIG. 1 is a top plan view of an order-fulfillment warehouse.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The invention is directed to proximate robot object detection and avoidance. Although not restricted to any particular robot application, one suitable application that the invention may be used in is order fulfillment. The use of robots in this application will be described to provide context for the proximate robot object detection and avoidance but is not limited to that application.

Referring to FIG. 1, a typical order-fulfillment warehouse 10 includes shelves 12 filled with the various items that could be included in an order. In operation, an incoming stream of orders 16 from warehouse management server 15 arrive at an order-server 14. The order-server 14 may prioritize and group orders, among other things, for assignment to robots 18 during an induction process. As the robots are inducted by operators, at a processing station (e.g. station 100), the orders 16 are assigned and communicated to robots 18 wirelessly for execution. It will be understood by those skilled in the art that order server 14 may be a separate server with a discrete software system configured to interoperate with the warehouse management system server 15 and warehouse management software or the order server functionality may be integrated into the warehouse management software and run on the warehouse management server 15.

Figure 2A:
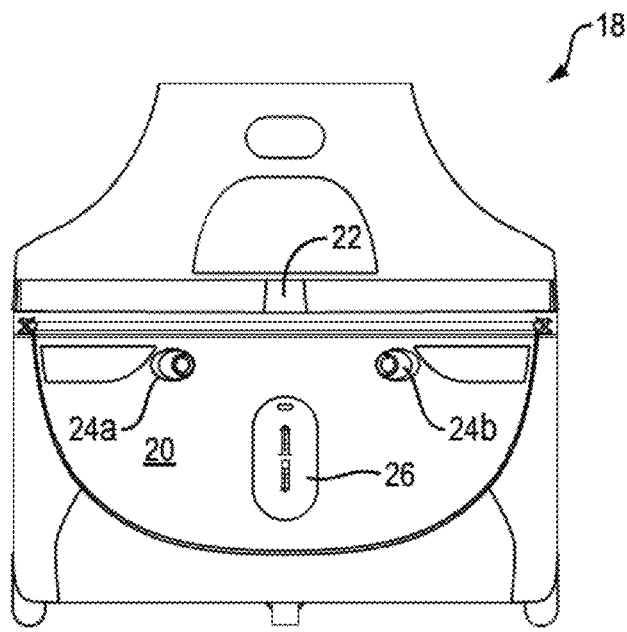
FIG. 2A is a front elevational view of a base of one of the robots used in the warehouse shown in FIG. 1.
Figure 2B:
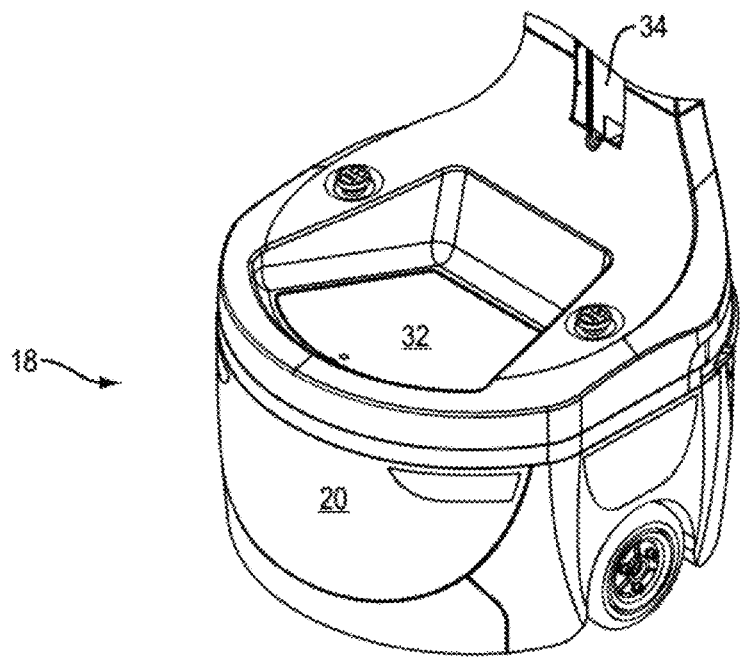
FIG. 2B is a perspective view of a base of one of the robots used in the warehouse shown in FIG. 1.
Figure 3:
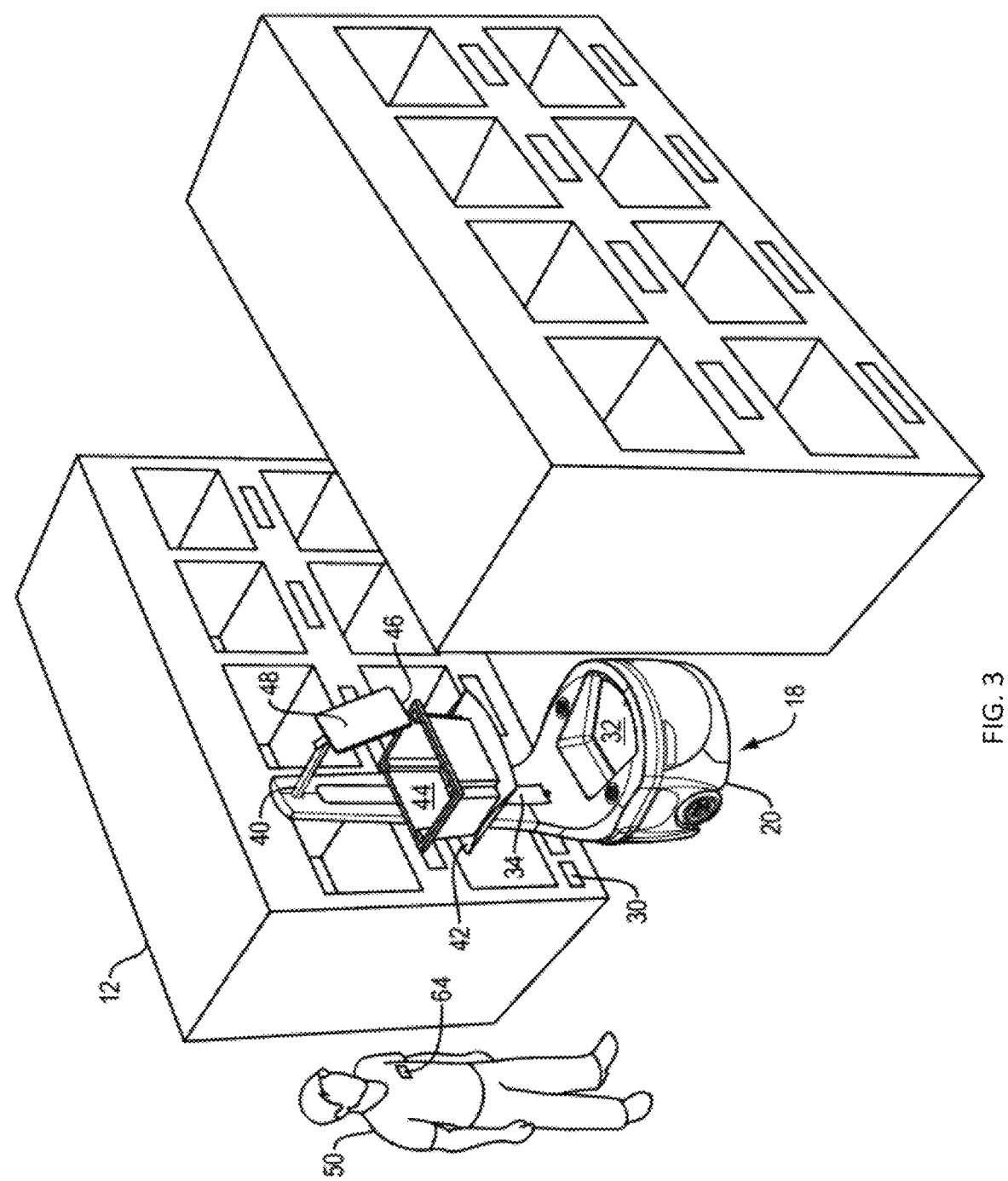
FIG. 3 is a perspective view of the robot in FIGS. 2A and 2B outfitted with an armature and parked in front of a shelf shown in FIG. 1.

In a preferred embodiment, a robot 18, shown in FIGS. 2A and 2B, includes an autonomous wheeled base 20 having a laser-radar 22. The base 20 also features a transceiver (not shown) that enables the robot 18 to receive instructions from and transmit data to the order-server 14 and/or other robots, and a pair of digital optical cameras 24a and 24b. The robot base also includes an electrical charging port 26 for re-charging the batteries which power autonomous wheeled base 20. The base 20 further features a processor (not shown) that receives data from the laser-radar and cameras 24a and 24b to capture information representative of the robot's environment. There is a memory (not shown) that operates with the processor to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8. Fiducial markers are also used to identify charging stations according to an aspect of this invention and the navigation to such charging station fiducial markers is the same as the navigation to the bin/location of items ordered. Once the robots navigate to a charging station, a more precise navigation approach is used to dock the robot with the charging station and such a navigation approach is described below.

Referring again to FIG. 2B, base 20 includes an upper surface 32 where a tote or bin could be stored to carry items. There is also shown a coupling 34 that engages any one of a plurality of interchangeable armatures 40, one of which is shown in FIG. 3. The particular armature 40 in FIG. 3 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although a robot 18 excels at moving around the warehouse 10, with current robot technology, it is not very good at quickly and efficiently picking items from a shelf and placing them in the tote 44 due to the technical difficulties associated with robotic manipulation of objects. A more efficient way of picking items is to use a local operator 50, which is typically human, to carry out the task of physically removing an ordered item from a shelf 12 and placing it on robot 18, for example, in tote 44. The robot 18 communicates the order to the local operator 50 via the tablet 48 (or laptop/other user input device), which the local operator 50 can read, or by transmitting the order to a handheld device used by the local operator 50.

Upon receiving an order 16 from the order server 14, the robot 18 proceeds to a first warehouse location, e.g. as shown in FIG. 3. It does so based on navigation software stored in the memory and carried out by the processor. The navigation software relies on data concerning the environment, as collected by the laser-radar 22, an internal table in memory that identifies the fiducial identification ("ID") of fiducial marker 30 that corresponds to a location in the warehouse 10 where a particular item can be found, and the cameras 24a and 24b to navigate.

Upon reaching the correct location (pose), the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a processing station 100, FIG. 1, where they are packed and shipped. While processing station 100 has been described with regard to this figure as being capable of inducting and unloading/packing robots, it may be configured such that robots are either inducted or unloaded/packed at a station, i.e. they may be restricted to performing a single function.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders.

The baseline navigation approach of this invention, as well as the semantic mapping of a SKU of an item to be retrieved to a fiducial ID/pose associated with a fiducial marker in the warehouse where the item is located, is described in detail below with respect to FIGS. 4-8.

Using one or more robots 18, a map of the warehouse 10 must be created and the location of various fiducial markers dispersed throughout the warehouse must be determined. To do this, one or more of the robots 18 as they are navigating the warehouse they are building/updating a map 10a, FIG. 4, utilizing its laser-radar 22 and simultaneous localization and mapping (SLAM), which is a computational problem of constructing or updating a map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create map 10a of warehouse 10 as robot 18 travels throughout the space identifying, open space 112, walls 114, objects 116, and other static obstacles, such as shelf 12, in the space, based on the reflections it receives as the laser-radar scans the environment.

Figure 4:
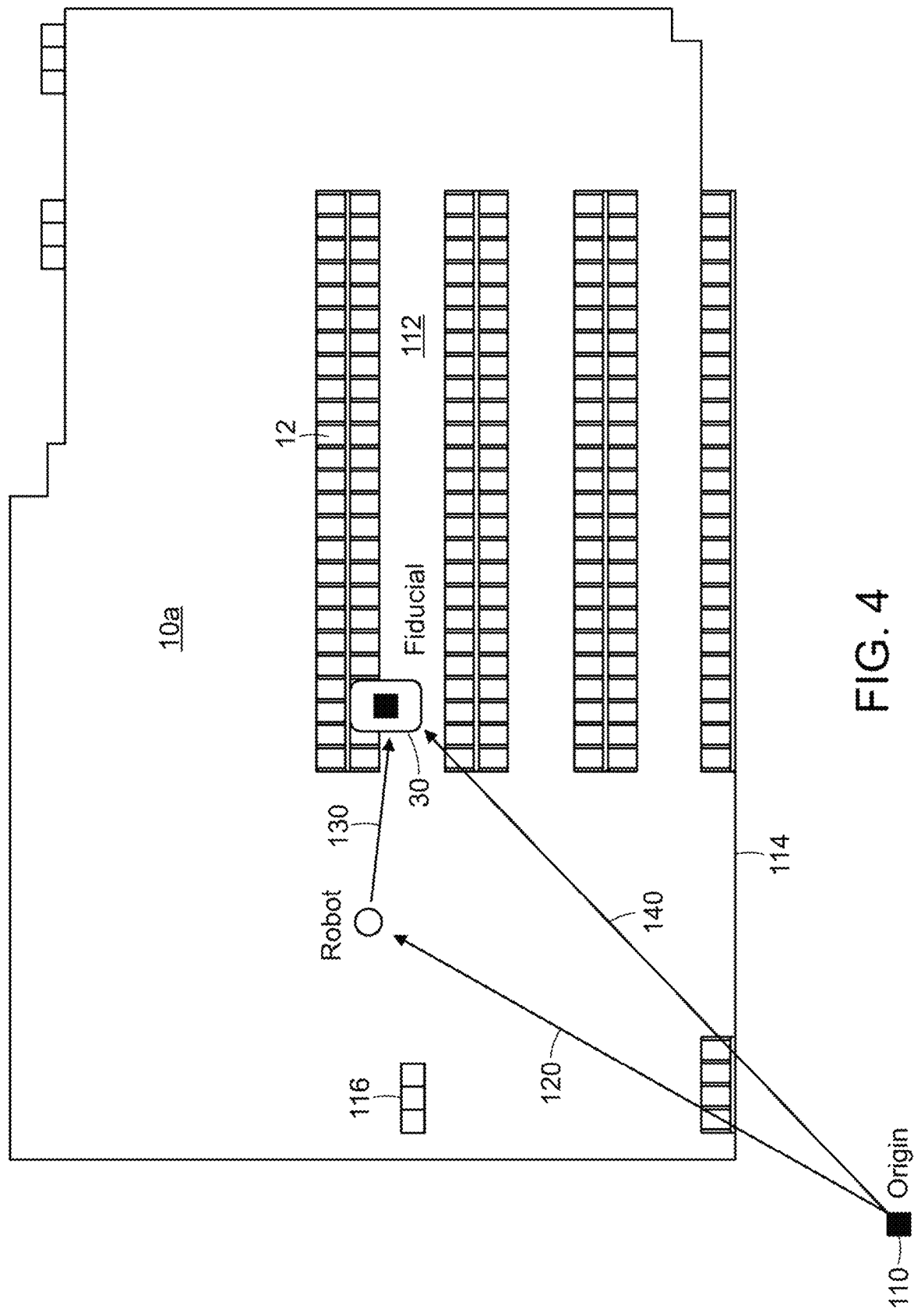
FIG. 4 is a partial map of the warehouse of FIG. 1 created using laser radar on the robot.

While constructing the map 10a (or updating it thereafter), one or more robots 18 navigates through warehouse 10 using camera 26 to scan the environment to locate fiducial markers (two-dimensional bar codes) dispersed throughout the warehouse on shelves proximate bins, such as 32 and 34, FIG. 3, in which items are stored. Robots 18 use a known starting point or origin for reference, such as origin 110. When a fiducial marker, such as fiducial marker 30, FIGS. 3 and 4, is located by robot 18 using its camera 26, the location in the warehouse relative to origin 110 is determined.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by a quaternion (x, y, z, ω) for fiducial marker 30 can be determined.

Figure 5:
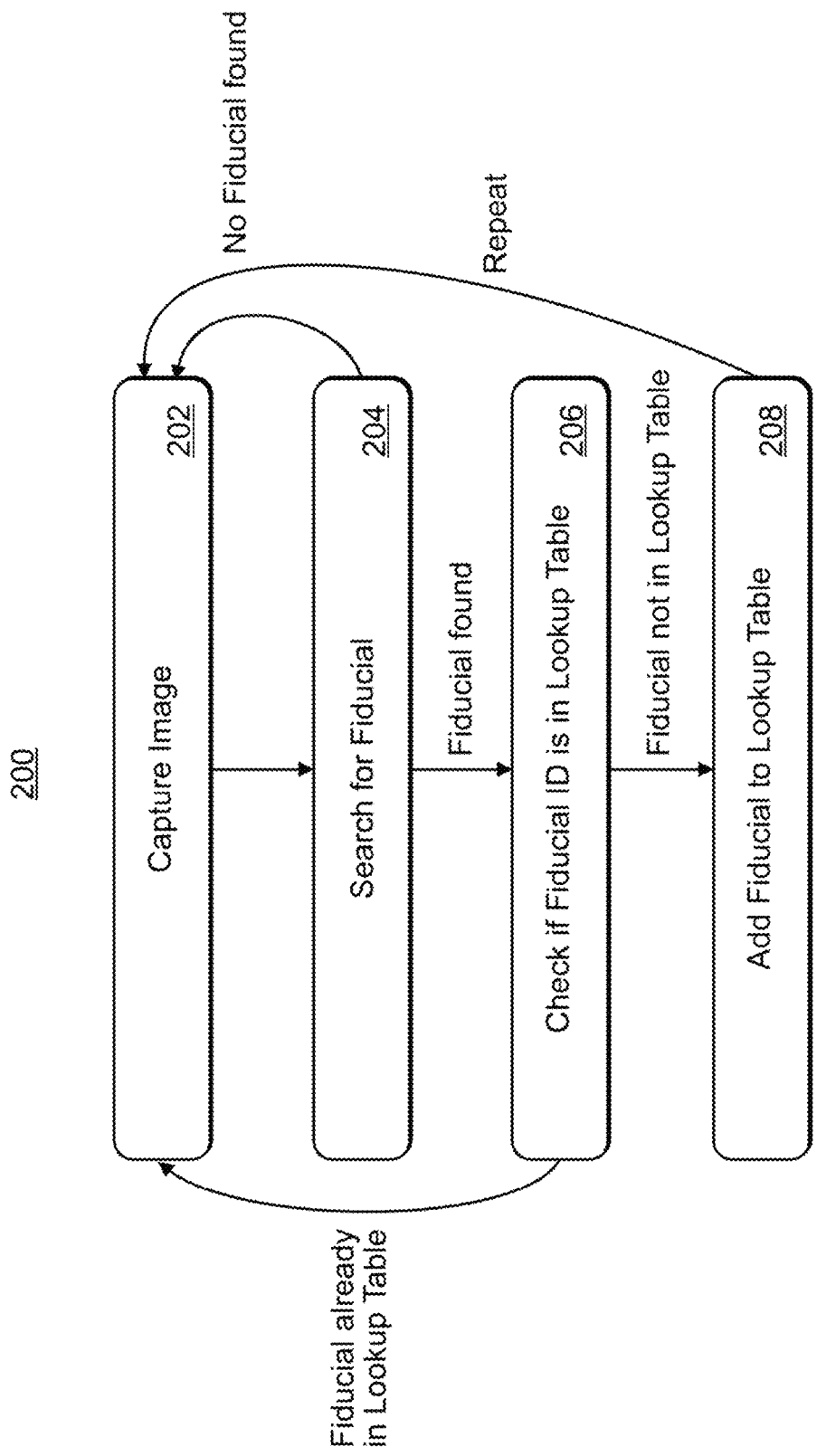
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using camera 26 captures an image and in step 204 searches for fiducial markers within the captured images. In step 206, if a fiducial marker is found in the image (step 204) it is determined if the fiducial marker is already stored in fiducial table 300, FIG. 6, which is located in memory 34 of robot 18. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot, there are included for each fiducial marker a fiducial identification, 1, 2, 3, etc., and a pose for the fiducial marker/bar code associated with each fiducial identification. The pose consists of the x,y,z coordinates in the warehouse along with the orientation or the quaternion (x,y,z, ω).

In another look-up Table 400, FIG. 7, which may also be stored in the memory of each robot, is a listing of bin locations (e.g. 402a-f) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, Robot 18 can determine the pose of the fiducial ID using the information in table 300, FIG. 6, and then navigate to the pose, as described herein.

Figure 8:
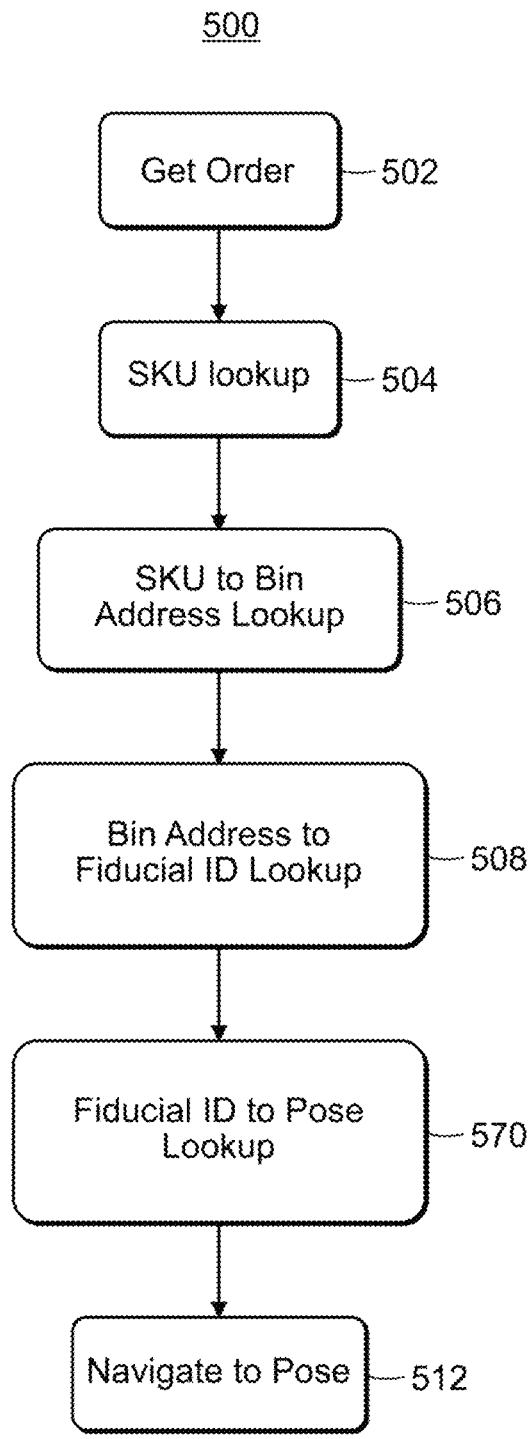
FIG. 8 is a flow chart depicting product SKU to pose mapping process.

The order fulfillment process according to this invention is depicted in flow chart 500, FIG. 8. In step 502, from warehouse management system 15, order server 14 obtains an order, which may consist of one or more items to be retrieved. It should be noted that the order assignment process is fairly complex and goes beyond the scope of this disclosure. One such order assignment process is described in commonly owned U.S. patent application Ser. No. 15/807,672, entitled Order Grouping in Warehouse Order Fulfillment Operations, filed on Sep. 1, 2016, which is incorporated herein by reference in its entirety. It should also be noted that robots may have tote arrays which allow a single robot to execute multiple orders, one per bin or compartment. Examples of such tote arrays are described in U.S. patent application Ser. No. 15/254,321, entitled Item Storage Array for Mobile Base in Robot Assisted Order-Fulfillment Operations, filed on Sep. 1, 2016, which is incorporated herein by reference in its entirety.

Continuing to refer to FIG. 8, in step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15/order server 14, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 26, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

As described above, a problem that can arise with multiple robots navigating within a space alongside people, equipment, and other obstacles can present a risk of navigational disruption, collisions, and/or traffic jams. In particular, other mobile equipment such as, for example, forklifts, tuggers, man-up trucks, lifts, etc. can create a particular risk of navigational disruption and/or collision with the robots. However, any non-permanent stationary equipment, objects, or edifices (e.g., scaffolds, ladders, safety signs, safety/road cones, or portable fencing) can also create increased risk of navigational disruption and/or collision. In order to mitigate such risk, described herein are systems and methods for proximate robot object detection and avoidance using proximity beacons. In particular, proximity beacons can be mounted to any such mobile or stationary equipment, objects, or edifices (hereinafter "equipment"). Each robot 18 can be configured to detect beacon proximity and whether the beacon is approaching, stationary, or withdrawing. In response, the robot can switch from an ordinary operation to a proximity operation to reduce or avoid navigational disruption and/or collision risk.

Figure 9:
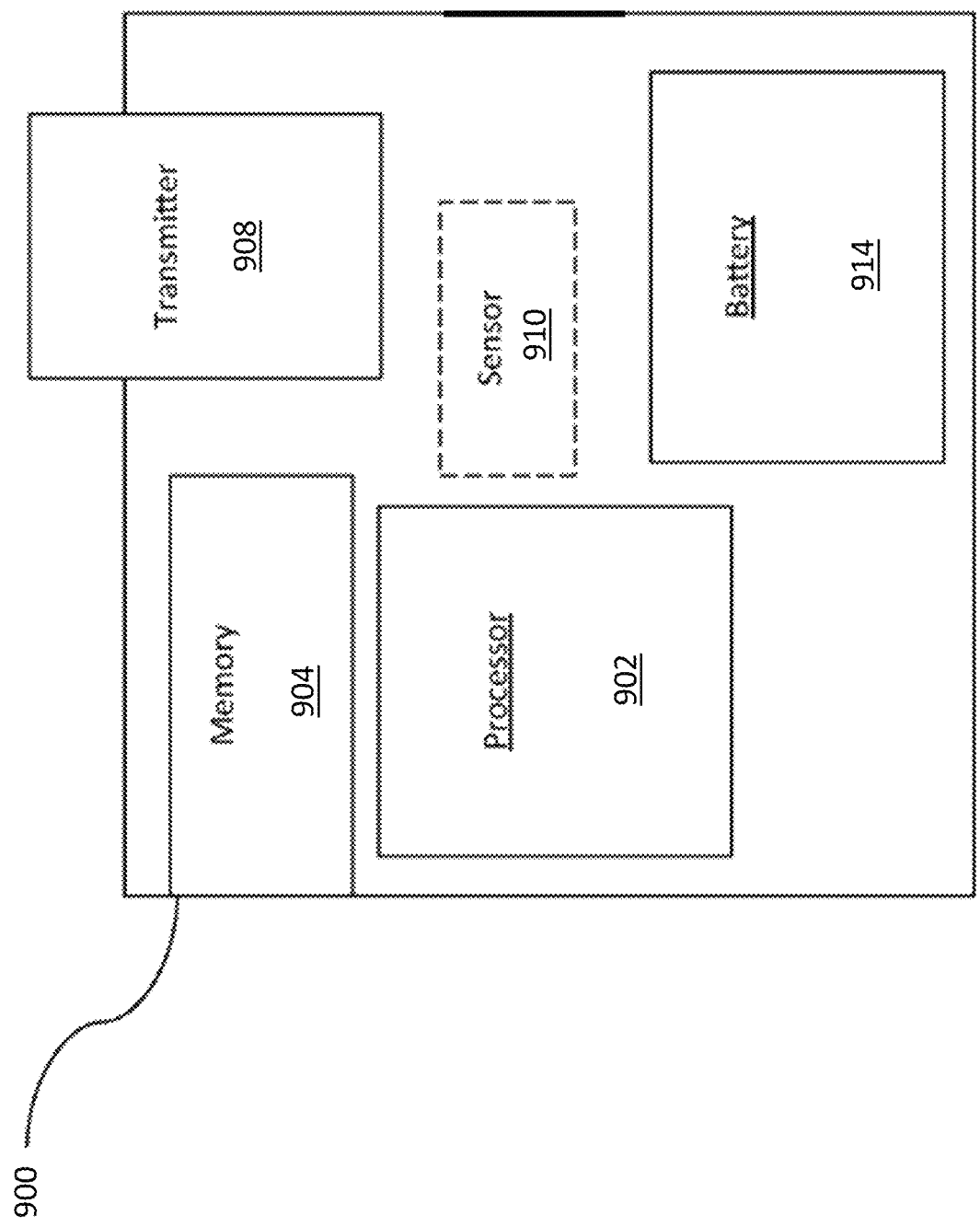
FIG. 9 is a block diagram of a beacon.

Referring to FIG. 9, in some embodiments, a beacon 900 may include a processor 902, a memory 904, and a transmitter 908 to produce a signal detectable by the robot. The beacon 900 may be battery 914 operated or, in some embodiments, hardwired to the equipment. The beacon 900 can typically broadcast information at a regularly scheduled interval using standard wireless protocols, such as Bluetooth Low Energy (BLE) and generally have a range of about, for example, up to 100 m or less. The frequency at which the information is broadcast as well as the format of the broadcast may be based on standard beacon formats, such as iBeacon, Eddystone, AltBeacon, any other existing beacon format, or a custom format. The beacon 900 can also include an input port and/or a near field communication (NFC) interface to facilitate secure communication for updates to the beacon 900 and/or to receive input from one or more sensors. Alternatively, in some embodiments, one or more sensors 910 can be integrated with the beacon 900. Such sensors 910 can include, for example, environmental sensors, equipment and equipment status sensors, location sensors, speed sensors, etc. such that the beacon 900, if appropriate, can transmit the received input.

To the extent that the beacon 900 is battery 914 powered, battery size and type can be selected to comport with a desired battery life and cost tolerance. Beacons typically have a battery life of approximately 4 years, although any suitable battery life can be provided depending on cost and longevity requirements. Because the beacon 900 is, in some embodiments, to be used in connection with equipment used in warehouses lacking climate control and/or extreme climate storage such as cold storage/freezers or hot humid greenhouses, the beacon 900 can advantageously be configured to be operable over a wide temperature range and in numerous environments. For example, the beacon 900 can be configured to operate in a temperature range of about −40° C. to about 50° C. In some embodiments, the beacon 900 can be provided with a protective enclosure providing Ingress Protection (IP) of 65/66 (impervious to dust and water jets) such that the beacon 900 is suitable for both indoor and outdoor use. The beacon 900 may also be certified for use in environmentally hazardous areas such as those comprising combustible gases and/or dust, and the like. The beacon 900, or at least an enclosure of the beacon 900, may be intrinsically safe and/or explosion proof.

Although generally described herein as being mounted on mobile or otherwise non-permanent equipment, in some embodiments, a beacon 900 can be located in a fixed location of particular import. For example, a portion of a warehouse for storing hazardous materials, or a large tank fixture where added caution by the robots when in proximity thereto, or even maintaining a safety buffer therearound is desirable. In either case, the beacon 900 can, in some embodiments transmit a basic beacon signal on a continuously repeating or sustained constant basis. Alternatively, the beacon 900 can transmit a more particularized informational message, generally in a repetitive manner. In some embodiments, the beacon 900 can also transmit more than one informational message sequentially and repeating continuously. For example, a beacon 900 may transmit ("forklift", "10 k/h", 10 m) to indicate that the beacon 900 is mounted to a forklift, traveling at 10 k/h. And, any robot detecting the signal may enter a proximity operation mode at a proximity of, for example, 10 m or closer. It will be apparent that such information can be conveyed in a single repeating message or can be conveyed by a repeating series of multiple (e.g., three) different messages.

With respect to inclusion of location information within the beacon signal, in some embodiments, the beacon 900 can transmit absolute location in terms of latitude and longitude, in terms of the x,y,z coordinates in the warehouse, in terms of x,y,z along with the orientation or the quaternion (x,y,z, ω) of the beacon, or the beacon may transmit a fiducial ID of one or more fiducials within the warehouse (e.g., an ID of the closest fiducial or a plurality of fiducial IDs defining a zone or aisle in which the beacon is located). Other state information such as, for example, a speed or velocity of the beacon, a type of equipment on which the beacon is mounted, etc. can be included in the information signal transmitted by the beacon. Beacon information can also include instructions to be followed within a proximity threshold of the beacon. For example, beacon information can include directives such as "speed limit of 5 kph" where the proximity is 20 m or less, "stop" where the proximity is 10 m or less and the beacon 900 is approaching the robot 18, or "do not enter Zone A" when the beacon is traversing Zone A.

Figure 10:
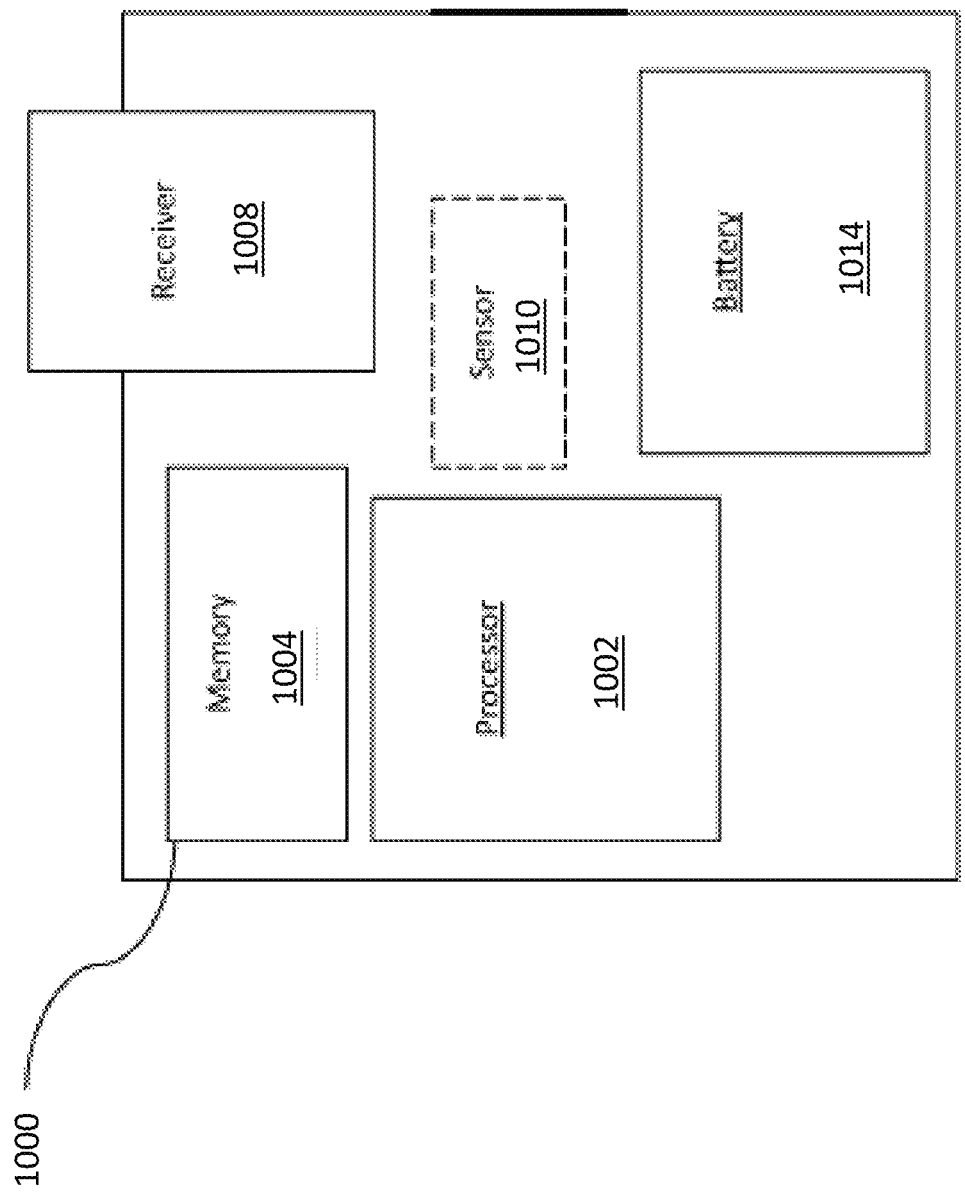
FIG. 10 is a block diagram of a receiving device.

Referring to FIG. 10, a receiving device 1000 operatively connected to a robot can include a processor 1002, memory 1004, and a receiver 1008. However, it will be apparent in view of this disclosure that, in some embodiments, portions or the entire functionality of the receiving device 1000 can be integrated communication with the tablet 48 of the robot 18 and/or the base of the robot. For example, in some embodiments, the proximate robot object detection and avoidance system can include a dedicated receiver 1008 which may be in communication with the processor and memory of the base 20 of the robot 18. In another example, the transceiver, processor, and memory of the base 20 of the robot 18 or the transceiver, processor, and memory of the tablet 48 can be substituted for the processor 1002, memory 1004, and receiver 1008 of the receiving device 1000.

The receiving device 1000 can include a dedicated battery 1014, can be powered by the batteries of the base 20 of the robot 18, or can be powered by the battery of the tablet 48. The components of the receiving device 1000 may be implemented on a hardware chip or tag to provide low cost receiving devices. In some embodiments, the receiving device 1000 may be integrated within the tablet 48 of the robot, the base 20 of the robot 18, or in a separate mobile device such as a laptop computer, a smart phone, a tablet and the like.

The receiving device 1000 can also include an input port and/or a near field communication (NFC) interface to facilitate secure communication for updates to the receiving device 1000 and/or to receive input from one or more sensors. Alternatively, in some embodiments, one or more sensors 1010 can be integrated with the receiving device 1000. Such sensors 1010 can include, for example, environmental sensors, robot and robot status sensors, location sensors, speed sensors, etc. such that the receiving device 1000, if appropriate, can better utilize received input.

To the extent that the receiving device 1000 is powered by an integral battery 1014, battery size and type can be selected to comport with a desired battery life and cost tolerance. Because the receiving device 1000 is, in some embodiments, to be used in connection with equipment used in warehouses lacking climate control and/or extreme climate storage such as cold storage/freezers or hot humid greenhouses, the receiving device 1000 can advantageously be configured to be operable over a wide temperature range and in numerous environments. For example, the receiving device 1000 can be configured to operate in a temperature range of about −40° C. to about 50° C. In some embodiments, the receiving device 1000 can be provided with a protective enclosure providing Ingress Protection (IP) of 65/66 (impervious to dust and water jets) such that the receiving device 1000 is suitable for both indoor and outdoor use. The receiving device 1000 may also be certified for use in environmentally hazardous areas such as those comprising combustible gases and/or dust, and the like. The receiving device 1000, or at least an enclosure of the receiving device 1000, may be intrinsically safe and/or explosion proof.

In some embodiments, the robot 18 be configured to keep a list of active beacons that can be detected. Such a list can be stored, for example, in the memory 1004 of the receiving device 1000, in the memory of the base 20, in the memory of the tablet 48, in the WMS 15, in a remote server, or combinations thereof. If a particular active beacon is not detected over a number of scans, it may be removed from the list of active beacons. In embodiments, the number may be a predetermined number of scans. In embodiments, the number may be a predetermined number of consecutive scans. For each beacon, a normalized beacon strength may be calculated relative to the transmitted range for that beacon. The difference between the received strength of the beacon signal and the transmitted range (minimum received strength) may be normalized relative to the transmitted range.

$$\text{Normalized Beacon Strength} = \frac{\text{Received Strength} - \text{Minimum Strength}}{\text{Maximum Strength}}$$

The robot 18 can generally determine, for each beacon 900, an average beacon strength and/or changes in beacon strength (e.g., due to approach or withdrawal of the beacon) over a specified number of samples. The robot 18 can thus identify any beacons of interest and operate according to a proximity operation mode to minimize navigational disruption and/or collision risk. Once the beacon(s) of interest are no longer within a threshold proximity to the robot 18, the robot 18 can resume ordinary operation.

Figure 11:
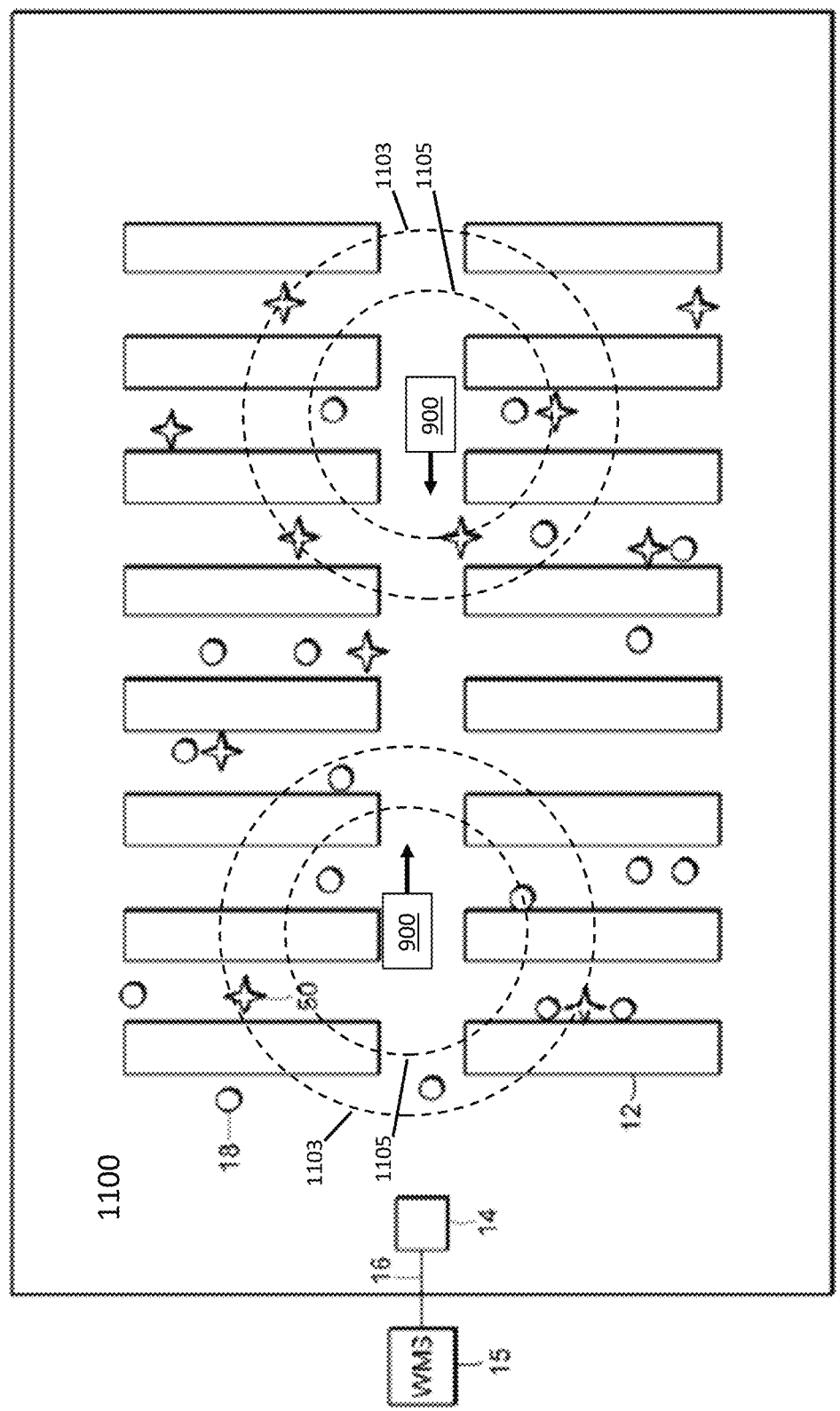
FIG. 11 is a top plan view of an order-fulfillment warehouse wherein robots interact with equipment having beacons mounted thereto.

FIG. 11 illustrates a sample navigational space 1100 (e.g., warehouse 10) having one or more beacons 900 mounted to equipment positioned and/or navigating within the space 1100. The beacons 900 can transmit within a transmission radius 1103 extending from the beacon 900. The robot 18, when within the transmission radius 1103, can detect a signal from the beacon 900 via the receiver 1000. Upon detecting the signal, the robot 18 can determine whether the robot is within a proximity threshold 1105, which can be co-equal with or smaller than the transmission radius 1103. To the extent that the robot 18 is within the proximity threshold 1105, the robot 18, if appropriate, can then switch from an ordinary operation mode to a proximity operation mode.

The proximity operation mode can be dictated by the signal as described above with reference to FIG. 9 or can be determined by the robot 18 based on information known by the robot 18 in combination with any signal information received. For example, where the beacon signal is a basic constant or repeating signal, the robot 18 can estimate proximity range based on received signal strength. Additionally, by taking a series of proximity range measurements over time, the robot 18 can determine whether the beacon 900 is stationary, approaching the robot 18, or withdrawing from the robot 18. The robot 18 can also calculate an approximate approach or withdrawal velocity of the beacon 900. By making such determinations, the robot 18 can determine an appropriate proximity operation mode.

In either case, the selected proximity operation mode(s) can cause the robot 18 to take any suitable action. For example, in some embodiments the proximity operation mode can cause the robot 18 to stop and wait or to operate at a reduced or increased speed to avoid potential collisions and/or navigational disruptions (e.g., avoid creating a traffic jam with oncoming equipment, avoid needing to take a detour, or any other avoidable navigational disruption). Also for example, in some embodiments, the proximity operation mode can cause the robot 18 to reroute its travel path, reverse direction, travel closer to a side (or middle) of the aisle, maintain a buffer zone around the equipment associated with the detected beacon 900, to exclude itself from a particular zone or aisle, to take any other suitable action, or combinations thereof. Once the beacon(s) of interest are no longer within a threshold proximity to the robot 18, the robot 18 can resume ordinary operation and/or select a new proximity operation mode consistent with any remaining beacons of interest.

It will be apparent in view of this disclosure that the example proximate robot object detection and avoidance techniques are described above for illustration purposes only and that any other beacon message, beacon configuration, receiver configuration, or proximity operation mode can be implemented in accordance with various embodiments.

Non-Limiting Example Computing Devices

Figure 12:
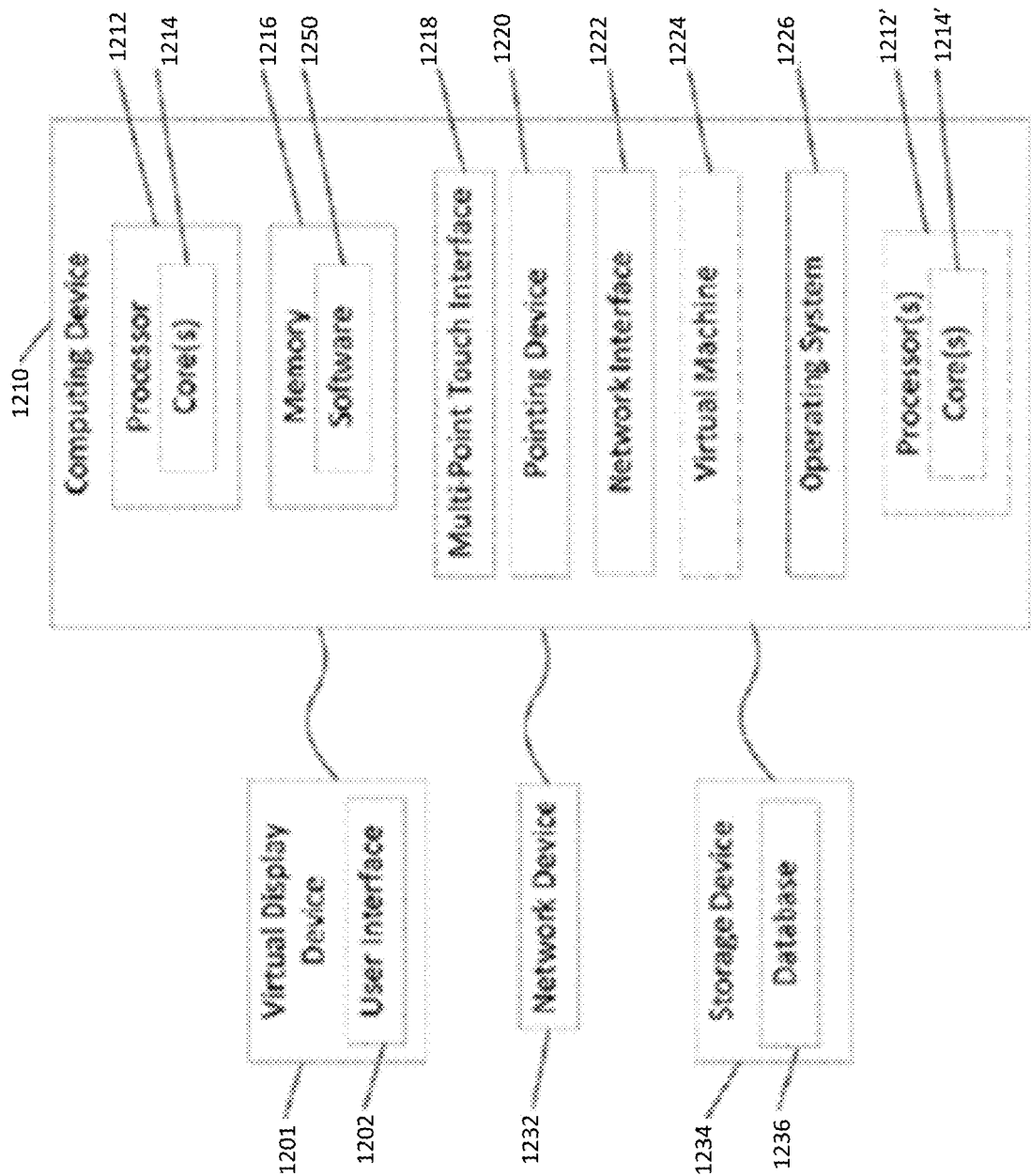
FIG. 12 is a block diagram of an exemplary computing system.

FIG. 12 is a block diagram of an exemplary computing device 1210 such as can be used, or portions thereof, in accordance with various embodiments as described above with reference to FIGS. 1-11. The computing device 1210 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 1216 included in the computing device 1210 can store computer-readable and computer-executable instructions or software for performing the operations disclosed herein. For example, the memory can store software application 1240 which is programmed to perform various of the disclosed operations as discussed with respect to FIGS. 1-11. The computing device 1210 can also include configurable and/or programmable processor 1212 and associated core 1214, and optionally, one or more additional configurable and/or programmable processing devices, e.g., processor(s) 1212' and associated core (s) 1214' (for example, in the case of computational devices having multiple processors/cores), for executing computer-readable and computer-executable instructions or software stored in the memory 1216 and other programs for controlling system hardware. Processor 1212 and processor(s) 1212' can each be a single core processor or multiple core (1214 and 1214') processor.

Virtualization can be employed in the computing device 1210 so that infrastructure and resources in the computing device can be shared dynamically. A virtual machine 1224 can be provided to handle a process running on multiple processors so that the process appears to be using only one computing resource rather than multiple computing resources. Multiple virtual machines can also be used with one processor.

Memory 1216 can include a computational device memory or random access memory, such as but not limited to DRAM, SRAM, EDO RAM, and the like. Memory 1216 can include other types of memory as well, or combinations thereof.

A user can interact with the computing device 1210 through a visual display device 1201, 111A-D, such as a computer monitor, which can display one or more user interfaces 1202 that can be provided in accordance with exemplary embodiments. The computing device 1210 can include other I/O devices for receiving input from a user, for example, a keyboard or any suitable multi-point touch interface 1218, a pointing device 1220 (e.g., a mouse). The keyboard 1218 and the pointing device 1220 can be coupled to the visual display device 1201. The computing device 1210 can include other suitable conventional I/O peripherals.

The computing device 1210 can also include one or more storage devices 1234, such as but not limited to a hard-drive, CD-ROM, or other computer readable media, for storing data and computer-readable instructions and/or software that perform operations disclosed herein. Exemplary storage device 1234 can also store one or more databases for storing any suitable information required to implement exemplary embodiments. The databases can be updated manually or automatically at any suitable time to add, delete, and/or update one or more items in the databases.

The computing device 1210 can include a network interface 1222 configured to interface via one or more network devices 1232 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1222 can include a built-in network adapter, network interface card, PCMCIA network card, card bus network adapter, wireless network adapter, USB network adapter, modem or any other device suitable for interfacing the computing device 1210 to any type of network capable of communication and performing the operations described herein. Moreover, the computing device 1210 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 1210 can run any operating system 1226, such as any of the versions of the Microsoft® Windows® operating systems (Microsoft, Redmond, Wash.), the different releases of the Unix and Linux operating systems, any version of the MAC OS® (Apple, Inc., Cupertino, Calif.) operating system for Macintosh computers, any embedded operating system, any real-time operating system, any open source operating system, any proprietary operating system, or any other operating system capable of running on the computing device and performing the operations described herein. In exemplary embodiments, the operating system 1226 can be run in native mode or emulated mode. In an exemplary embodiment, the operating system 1226 can be run on one or more cloud machine instances.

Figure 13:
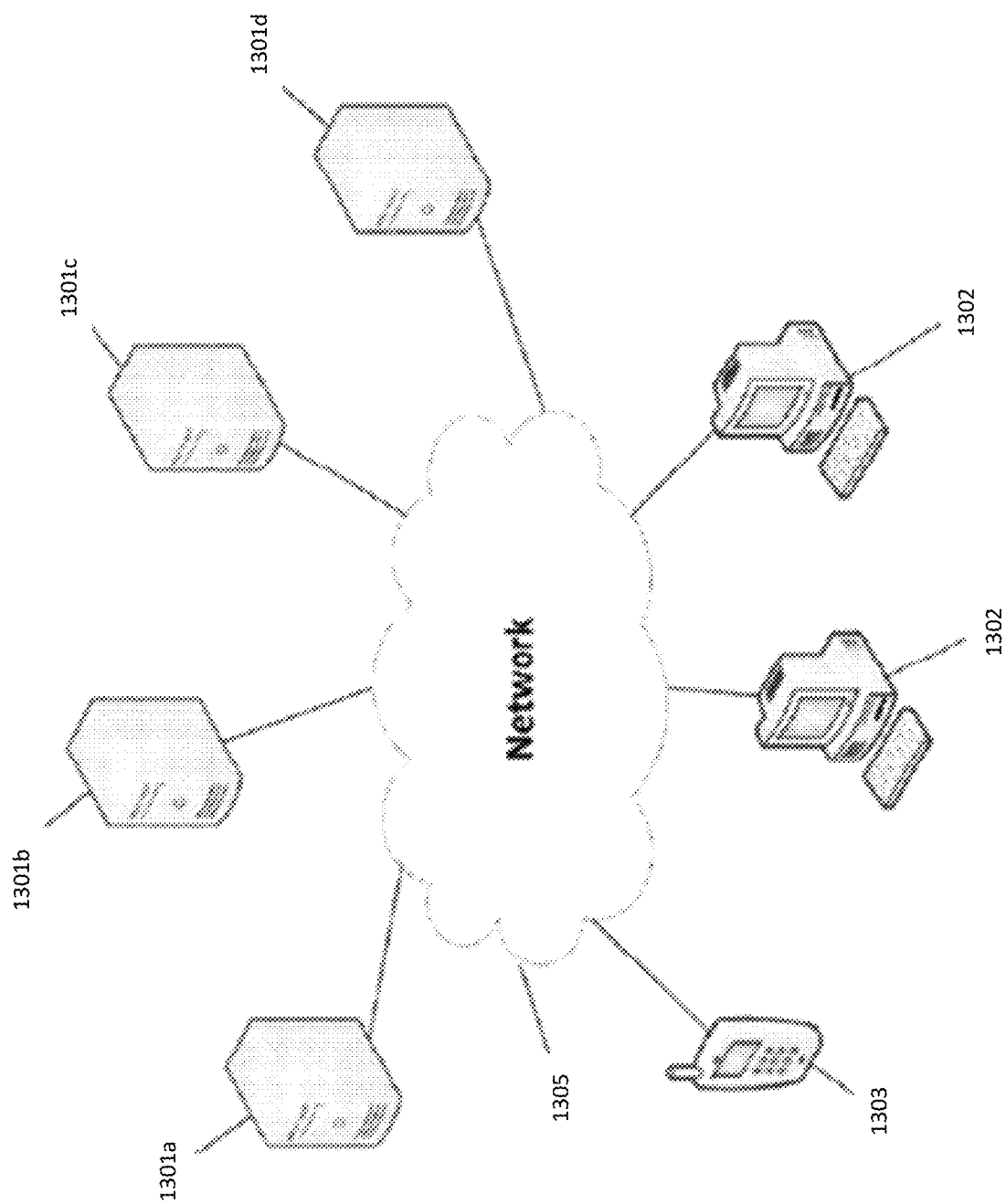
FIG. 13 is a network diagram of an exemplary distributed network.

FIG. 13 is an example computational device block diagram of certain distributed embodiments. Although FIGS. 1-11, and portions of the exemplary discussion above, make reference to a warehouse management system 15 and an order-server 14 each operating on an individual or common computing device, one will recognize that any one of the warehouse management system 15 or the order-server 14 may instead be distributed across a network 1305 in separate server systems 1301*a-d* and possibly in user systems, such as kiosk, desktop computer device 1302, or mobile computer device 1303. For example, the order-server 14 may be distributed amongst the tablets 48 of the robots 18. In some distributed systems, modules of any one or more of the warehouse management system software and/or the order-server software can be separately located on server systems 1301*a-d* and can be in communication with one another across the network 1305.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

Having described the invention, and a preferred embodiment thereof, what is claimed as new and secured by letters patent is:

What is claimed is:

1. A proximate robot object detection and avoidance system comprising:
   a receiver in electronic communication with an autonomous robot and configured to receive a broadcast message from a beacon;
   a processor; and
   a memory, the memory storing instructions that, when executed by the processor, cause the autonomous robot to:
   detect, based on the received broadcast message, a proximity of the beacon to the autonomous robot,
   determine, from beacon state information of the received broadcast message, a beacon status, the beacon status indicating whether the beacon is stationary, approaching the autonomous robot, or withdrawing from the autonomous robot, wherein the beacon state information includes location information including at least one of an x, y, z, ω quaternion of the robot within a navigational space, an x, y, z coordinate location within the navigational space, at least one fiducial ID of one or more fiducial IDs within the navigational space, or combinations thereof, the beacon state information further including at least one of a speed or velocity of the beacon within the navigational space,
   identify, according to the detected proximity and the determined beacon status, a corresponding proximity operation, and
   control the autonomous robot to stop an ordinary operation and operate according to the identified proximity operation.

2. The system of claim 1, wherein operating the autonomous robot according to the identified proximity operation includes at least one of causing the autonomous robot to operate at reduced speed, causing the autonomous robot to remain in place for a predetermined wait time, causing the autonomous robot to navigate to a new location, causing the autonomous robot to remain in place until the determined beacon status changes, or combinations thereof.

3. The system of claim 1, wherein:
the receiver is further configured to receive a second broadcast signal from the beacon; and
the memory further storing instructions that, when executed by the processor, cause the autonomous robot to:
detect, based on the second received broadcast message, an updated proximity of the beacon to the autonomous robot,
determine, from the second received broadcast message, an updated beacon status, the updated beacon status indicating whether the beacon is stationary, approaching the autonomous robot, or withdrawing from the autonomous robot,
identify, according to the detected updated proximity and the determined updated beacon status, a corresponding second proximity operation, and
control the autonomous robot to stop the proximity operation and operate according to the identified second proximity operation.

4. The system of claim 3, wherein operating the autonomous robot according to the identified second proximity operation at least one of causing the autonomous robot to operate at reduced speed, causing the autonomous robot to remain in place for a predetermined wait time, causing the autonomous robot to navigate to a new location, causing the autonomous robot to remain in place until the determined beacon status changes, causing the autonomous robot to revert to ordinary operation, or combinations thereof.

5. The system of claim 1, wherein the beacon state information includes at least one of a prescribed proximity in which the proximity operation applies, a proximity operation instruction, or combinations thereof.

6. An autonomous robot comprising:
a receiver configured to receive a broadcast message from a beacon;
a processor; and
a memory, the memory storing instructions that, when executed by the processor, cause the autonomous robot to:
detect, based on the received broadcast message, a proximity of the beacon to the autonomous robot,
determine, from beacon state information of the received broadcast message, a beacon status, the beacon status indicating whether the beacon is stationary, approaching the autonomous robot, or withdrawing from the autonomous robot, wherein the beacon state information includes location information including at least one of an x, y, z, ω quaternion of the robot within a navigational space, an x, y, z coordinate location within the navigational space, at least one fiducial ID of one or more fiducial IDs within the navigational space, or combinations thereof, the beacon state information further including at least one of a speed or velocity of the beacon within the navigational space,
identify, according to the detected proximity and the determined beacon status, a corresponding proximity operation, and
control the autonomous robot to stop an ordinary operation and operate according to the identified proximity operation.

7. The autonomous robot of claim 6, wherein the beacon is not positioned on the robot.

8. The autonomous robot of claim 7, wherein the beacon is mounted to at least one of mobile equipment or non-permanent stationary equipment.

9. The autonomous robot of claim 8, wherein the mobile equipment includes one or more of a forklift, a tugger, a man-up truck, a lift, or combinations thereof.

10. The autonomous robot of claim 8, wherein the non-permanent stationary equipment includes one or more of a scaffold, a ladder, a safety sign, a safety cone, portable fencing, or combinations thereof.

11. The autonomous robot of claim 6, wherein operating the autonomous robot according to the identified proximity operation includes at least one of causing the autonomous robot to operate at reduced speed, causing the autonomous robot to remain in place for a predetermined wait time, causing the autonomous robot to navigate to a new location, causing the autonomous robot to remain in place until the determined beacon status changes, or combinations thereof.

12. The autonomous robot of claim 6, wherein:
the receiver is further configured to receive a second broadcast signal from the beacon; and
the memory further storing instructions that, when executed by the processor, cause the autonomous robot to:
detect, based on the second received broadcast message, an updated proximity of the beacon to the autonomous robot,
determine, from the second received broadcast message, an updated beacon status, the updated beacon status indicating whether the beacon is stationary, approaching the autonomous robot, or withdrawing from the autonomous robot,
identify, according to the detected updated proximity and the determined updated beacon status, a corresponding second proximity operation, and
control the autonomous robot to stop the proximity operation and operate according to the identified second proximity operation.

13. The autonomous robot of claim 12, wherein operating the autonomous robot according to the identified second proximity operation includes at least one of causing the autonomous robot to operate at reduced speed, causing the autonomous robot to remain in place for a predetermined wait time, causing the autonomous robot to navigate to a new location, causing the autonomous robot to remain in place until the determined beacon status changes, causing the autonomous robot to revert to ordinary operation, or combinations thereof.

14. The autonomous robot of claim 6, wherein the beacon state information includes at least one of a prescribed proximity in which the proximity operation applies, a proximity operation instruction, or combinations thereof.

* * * * *